United States Patent [19]

Burk

[11] Patent Number: 4,880,108

[45] Date of Patent: Nov. 14, 1989

[54] TUBULAR CARRIER PIN

[76] Inventor: Robert G. Burk, 821 Main St., Holyoke, Mass. 01040

[21] Appl. No.: 323,067

[22] Filed: Mar. 13, 1989

Related U.S. Application Data

[63] Continuation of Ser. No. 74,048, Jul. 16, 1987, abandoned.

[51] Int. Cl.$^4$ .............................................. B65G 17/42
[52] U.S. Cl. ............................ 198/803.12; 198/487.1
[58] Field of Search ........................ 198/803.12, 487.1

[56] References Cited

U.S. PATENT DOCUMENTS

| | | | |
|---|---|---|---|
| 2,233,555 | 3/1941 | Reisinger | 198/803.12 X |
| 3,344,904 | 10/1967 | Kocian et al. | 198/803.12 |
| 3,365,158 | 1/1968 | Dowling | 198/803.12 X |
| 3,915,288 | 10/1975 | Szpitalak | 198/803.12 |
| 4,129,206 | 12/1978 | Talbott | 198/803.12 X |
| 4,388,990 | 6/1983 | Michalik | 198/803.12 X |
| 4,501,351 | 2/1985 | Tracy | 198/803.12 X |

FOREIGN PATENT DOCUMENTS

| | | | |
|---|---|---|---|
| 2234115 | 1/1974 | Fed. Rep. of Germany | 198/803.12 |
| 0037611 | 2/1986 | Japan | 198/803.12 |
| 0595943 | 2/1978 | Switzerland | 198/803.12 |

*Primary Examiner*—Robert J. Spar
*Assistant Examiner*—Lyle K. Kimms
*Attorney, Agent, or Firm*—James Creighton Wray

[57] ABSTRACT

A plug-in tubular carrier pin is provided for a chain assembly. The pin is larger in diameter than conventional carrier pins and has a plug pin insertable into one end of a cylindrical body being held in place by a crimp in the cylindrical body. A rounded nose is either integrally formed with the cylindrical body or inserted into the end opposite the plug pin and held in place by an additional crimp.

10 Claims, 2 Drawing Sheets

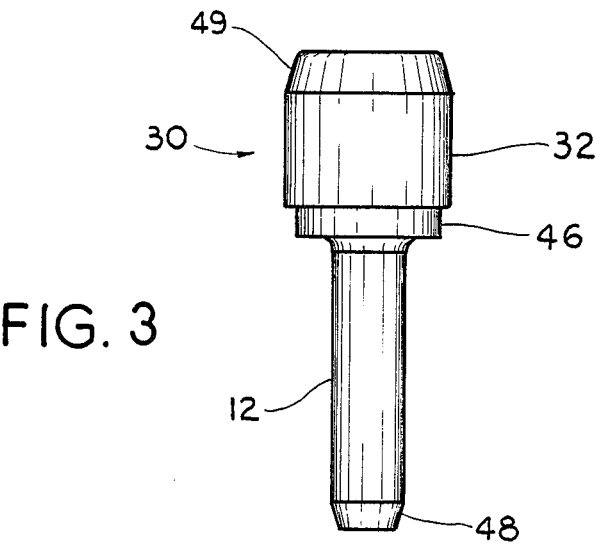
FIG. 3
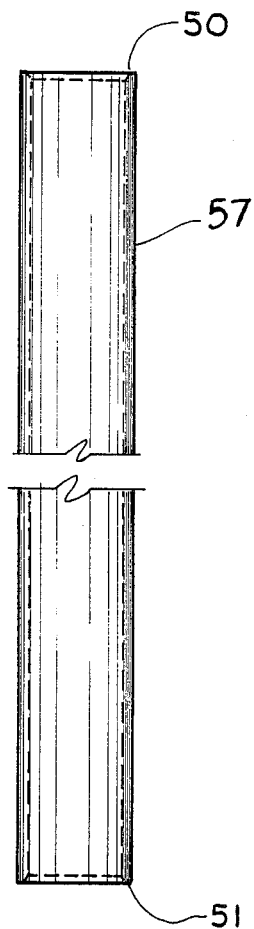
FIG. 5
FIG. 4
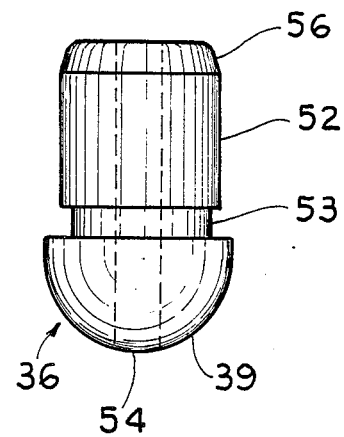

TUBULAR CARRIER PIN

This is a continuation of Ser. No. 07/074,048, filed July 16, 1987, now abandoned.

BACKGROUND OF THE INVENTION

This invention relates generally to chains and more particularly to chain assemblies having replaceable plug-in modules.

Moreover, this invention relates to an improvement or variation on the chain assembly described in U.S. Pat. No. 4,501,351, in which are described plug-in modules having easily replaceable extended pins for carrying devices.

Examples of pertinent patents are U.S. Pat. Nos. 1,707,088; 4,129,206; 3,344,904; 3,365,158; and 3,915,288.

U.S. Pat. No. 1,707,088 shows an article support pin attached through a chain link and riveted in place on the chain. U.S. Pat. No. 4,129,206 shows a pin having a rotatable sleeve attached to the pin by a socket means. When damaged, the sleeve is easily removed and replaced while the pin remains attached to the chain.

U.S. Pat. Nos. 3,444,904 and 3,365,158 show pins, each having a shoulder which abuts the outer surface of the chain and a reduced, threaded portion which extends through to the inner surface of the chain. A nut is threaded onto the reduced portion of the pin to secure the pin to the chain. U.S. Pat. No. 3,915,288 shows a sleeve similar to those of U.S. Pat. Nos. 3,344,904 and 3,365,158.

U.S. Pat. Nos. 2,565,593; 788,542; 3,166,103; 3,086,641; 3,205,0041; 3,206,0051; 3,770,1071; 3,387,829 and 3,625,338 are also pertinent to the state of the art in attaching pins to chain link systems.

U.S. Pat. No. 4,501,351 solved one problem by providing extended pins or attachments that are quickly and easily removable and replaceable. Previous chain assemblies have proven unsatisfactory in this regard because they require disconnection of the chain to remove the attachments.

However, a need exists to provide an easily removable and replaceable pin or attachment that is particularly adapted for carrying easily damaged products such as light gauge aluminum cans being carried by the chain assembly on the extended pins and/or being transferred on or off the carrier pins. The conventional "ball head" pin shown in U.S. Pat. No. 4,501,351 is of a relatively small diameter and does not discourage bouncing and swirling of the cans as it is carried.

SUMMARY OF THE INVENTION

The present invention overcomes many of the problems which exist in the prior art devices.

Roller chains are made up of interconnected alternating pins and roller links.

The chain assembly of the present invention includes a pin link having a hollow pin for receiving the plug-in module. The hollow pin is connected to a unique roller link. The pin adjacent to the hollow pin extends through its pin plate, and part of the plug-in module slips over the extended pin. To hold the module on the chain, a cotter pin is inserted in a hole in the end of the extended pin. All links in the chain remain connected during removal or replacement of the module.

A unique tubular carrier pin is provided with a rounded nose which prevents dents in the light gauge aluminum cans being carried therein. The nose part can be plastic, aluminum or steel, so long as a spherical or hemi-spherical shape of relatively large diameter is used. The preferred material is vigin polytetrafluoroethylene (PTFE), known as TEFLON.

The large diameter of the tube tends to stabilize the can and minimize bouncing and swirling of the can as it is carried by the pin on the conveyor chain assembly.

The tubular pin and plate assembly can be plugged into the "plug-in" chain described in U.S. Pat. No. 4,501,351 in place of the extended pin having a smaller diameter ball head.

In a variation on the invention, the nose is integrally formed with the tube, thereby eliminating manufacturing process steps and components, thereby reducing cost of manufacturing.

Objects of the invention are, therefore, to provide an improved chain assembly and to provide a chain assembly having a tubular carrier pin plug-in module that can be easily removed without disconnecting the chain.

Another object of the invention is to provide a chain assembly having a tubular chain pin plug-in module that can be easily replaced without disconnecting the chain.

Another object of the invention is to provide a chain assembly having a tubular carrier pin plug-in module that can be easily replaced with a module having different dimensions or characteristics without disconnecting the chain.

Another object of the invention is to provide a chain assembly having a plug-in module that can be easily repaired without disconnecting the chain.

Another object of the invention is to provide a tubular carrier pin that can be easily assembled into a chain assembly.

Another object of the invention is to providea method of manufacturing a tubular carrier pin which reduces costs.

These and other and further objects and features of the invention are apparent in the disclosure which includes the above and below specification and claims and drawings.

BRIEF DESCRIPTION OF THE DRAWINGS

FIG. 3 is a detail side elevation view of the pin plug of the present invention.

FIG. 4 is a detail side elevation view of the preferred end plug of the invention.

FIG. 5 is a detail side elevation of the preferred cylindrical body of the invention.

DETAILED DESCRIPTION OF THE DRAWINGS

Figures 1, 1A, 2:
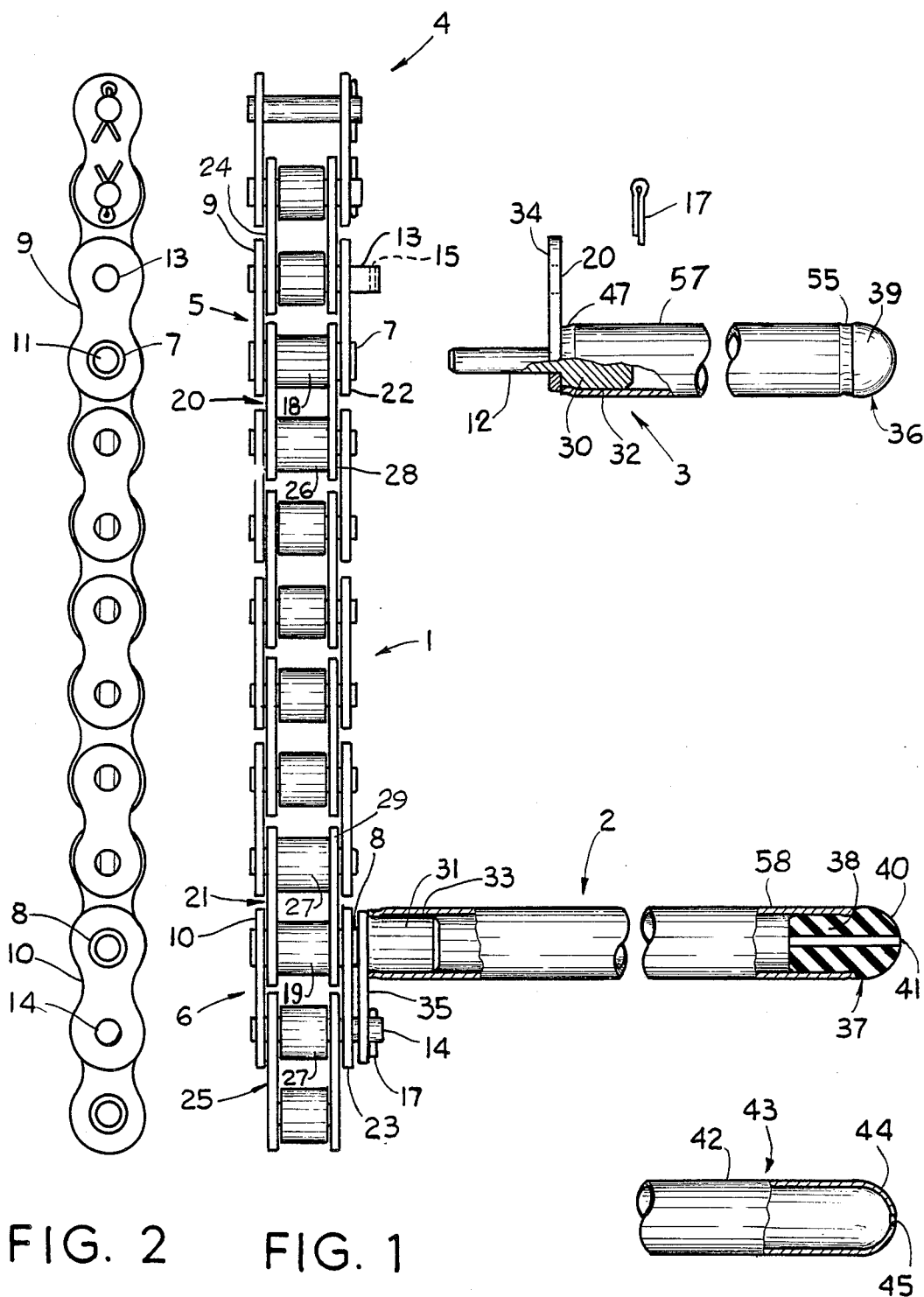
FIG. 1 is a top view, partly in section, of a chain assembly tubular carrier pin plug-in module embodying the features of the present invention.
FIG. 1A is a variation on the end portion of the tubular carrier pin shown in FIG. 1.
FIG. 2 is a side elevation view of the chain assembly shown in FIG. 1, with carrier pins removed for illustration.

Referring now to the drawings, chain assembly 1 has plug-in modules 2, 3 and 4. Pin links 5, 6 have hollow pins 7, 8 being press-fit or otherwise rigidly attached to pin links 9, 10. Hollow pin 7 has hollow portion 11 for insertion of pintle 12 of plug-in module 3. Pin links 9, 10 also have extended pins 13, 14 riveted or otherwise rigidly attached to pin links 9, 10. Extended pin 13 has a small hole 15 in its end protruding through chain 4 for receiving a cotter pin. A similar arrangement is shown for extended pin 14 having cotter pin 17.

Hollow pins 7, 8 of pin links 5, 6 are inserted through bushings 18, 19 of roller links 20, 21. Extended pin 13 of pin link 5 is inserted through roller link 24. A similar extended pin 14 of pin link 6 is inserted through roller link 25. Pin plates 22, 23 are pressed or otherwise attached to the pin links 5, 6. Pin plate 22 is attached to the pin link 5 securing the roller link 24 onto the extended pin 13 and the roller link 20 onto the hollow pin 7. Pin plate 23 is attached to the pin link 6 at its pins 8, 14 securing the roller link 25 onto the extended pin 14 and the roller link 21 onto hollow pin 8. Roller links 20, 21, 24, 25, although secured to pin links 9, 10 are free to move in a plane perpendicular to pins 7, 13, 8, 14.

Roller links 20, 21 have bushings 26, 27, 18, 19 press-fit or otherwise attached to roller plates 28, 29. In the preferred embodiment, these bushings are to be wider in diameter than the bushings in roller links not secured to hollow pins. The extra width is needed to accept the wider hollow pins 7, 8 which are designed with internal hollow areas, shown as 11 in hollow pin 7, of diameter similar to the diameter of the pins so that pins in pin links could fit into the hollow pins of the pin links.

A floating bushing (not shown) is situated in a bushing of the roller link 21. Roller link 21 has a similar floating bushing, not shown in the drawings, situated in its bushing.

Floating bushings are described in U.S. Pat. No. 3,643,517. These floating bushings form collars to receive the pin links inserted through the roller links while facilitating movement of pin links only in the plane perpendicular to the pins.

For further details on how the roller links, pin plates, and pin links are connected, reference is made to the specification and drawings of U.S. Pat. No. 4,501,351.

Plug-in modules 2, 3 have plug pins 30, 31. Plug pin 30 has pintle 12 while the pintle of plug pin 31 is not illustrated. Plug pins 30, 31 have body portions 32, 33 which are necked at an area just beyond pin plates 34, 35 which are press-fit or otherwise attached to pintles of the plug pins 30, 31.

The plug pins are fitted into one end of cylindrical or tubular pins 57, 58 which are preferably rolled from sheet metal. The tubular pins have open ends into which are inserted tube end plugs 36, 37. End plugs 36, 37 have body portions such as 38 shown for end plug 37 received in the open end of the tubular pins and headed portions 39, 40 which are substantially hemispherically shaped and have a diameter coinciding to the diameter of the tubular pins. Each headed portion is necked at an area between the body and headed portions and has an axial passage 41.

When assembling the plug-in modules, the plug pins 30, 31 and tube end plugs 36, 37 are inserted into the opposite ends of the tubes. Subsequently, the tubular pins are crimped at areas corresponding to the necked areas of the plug pins and tube end plugs in order to hold fast the elements in the tubular pins.

In an alternative embodiment, as shown in FIG. 1A, an end portion 42 of tubular pin 43 is spun or otherwise formed or deformed to include an integral nose portion 44 having substantially the same shape as in the previously described embodiment. In forming the nose section, an axial passage 45 is also provided.

The tubular pin and plate are plugged into the "plug-in" chain assembly shown in the drawings.

In preferred embodiments end face edges of the tubular pins are beveled inwardly to facilitate insertion of the tightly fitting plug pins and tube end plugs. Similarly, the inserted ends of the plug pins and tube end plugs are beveled to further facilitate insertion.

Referring now to FIGS. 3–5, details of the component parts of each tubular carrier pin are shown. In FIG. 3, the pin plug 30 is shown as having a body portion 32 and a pintle portion 12. The body portion 32 is necked at 46 to cooperate with crimp 47 (shown in FIG. 1) in order to provide means for holding the pin plug in place. It can also be appreciated from FIG. 3 that opposite ends 48, 49 of the pin plug are tapered to facilitate both insertion of pintle 12 into the chain assembly and the body portion 32 into the tubular or cylindrical body 57, which is shown in FIG. 5. Opposite ends 50, 51 of the tubular body 57 are beveled inwardly to likewise facilitate insertion of both the pin plug 32 and the plug 36.

The plug 36, shown in FIG. 4, has a hemi-spherically shaped nose portion 39, a body portion 52 and a necked area 53 provided between the nose portion and the body portion. The plug is also provided with an axial bore 54 extending therethrough. The necked area 53 corresponds to the crimp 55 provided in the cylindrical body (see FIG. 1) in order to provide means for holding the plug fast with the cylindrical body. The inserted end 56 of the body portion 52 is tapered to facilitate insertion into the cylindrical body 57.

I claim:

1. A chain assembly comprising:
   a plurality of adjacent roller links joined together by a plurality of pin links, each pin link having a first pin plate rigidly attached to first and second pins for insertion through separate adjacent roller links and each pin link having a second pin plate for securing adjacent roller links onto said pins while allowing movement of said roller links in the plane perpendicular to the pins;
   wherein some of the pin links have a hollow first pin, wherein said hollow first pin has a larger diameter than said second pin;
   a support means inserted in said hollow first pin for supporting objects and carrying objects along a path parallel to chain assembly movement, the support means comprising a tubular carrier pin having a hollow cylindrical body, a plug pin insertable in one end of the body for insertion into said hollow first pin, a rounded nose at the opposite end of the body; and
   wherein the plug pin has a pintle portion and a body portion, wherein the body portion has a larger diameter than the pintle portion and the body portion is received in one end of the cylindrical body, and a pin plate fixedly connected to the plug pin at the junction of the pintle and body portions for securing the plug pin to the chain assembly.

2. The assembly of claim 1 wherein the hollow cylindrical body is made of rolled sheet metal.

3. The assembly of claim 2 wherein the outer diameter of the cylindrical body is approximately 0.7 inches.

4. The assembly of claim 1 wherein the body portion of the plug pin has a neck near the conjunction of the body and pintle portions.

5. The assembly of claim 4 wherein the cylindrical body has a crimp after receiving the plug pin at the area where the body portion of the plug pin is necked.

6. The assembly of claim 1 wherein the rounded nose comprises a plug having a body portion insertable into the end of the body opposite the plug pin and a nose portion having a substantially hemi-spherical shape.

7. The assembly of claim 6 wherein the body portion of the plug has a neck at the conjunction of the body and nose portions, and the cylindrical body is crimped at the necked area to hold the plug in position.

8. The assembly of claim 1 wherein the rounded nose is formed integrally with the cylindrical body.

9. The assembly of claim 6 wherein the plug is made of polytetrafluoroethylene.

10. A tubular carrier pin for plug-in connection to a chain assembly, comprising:

a cylindrical body having proximal and distal ends relative to the chain assembly;

a plug pin extending outwardly from the proximal end for supporting the carrier pin on the chain assembly, wherein the plug pin has an enlarged body portion received in the cylindrical body and held in place by a crimp in the cylindrical body, and the plug pin has a pintle portion and a pin plate fixedly connected to the plug pin at the junction of the pintle and body portions for securing the plug pin to the chain assembly;

a rounded nose at the distal end, wherein the rounded nose comprises a plug having a body portion insertable into the distal end of the cylindrical body and a rounded portion extending outwardly from the distal end, wherein the plug is held in place by a second crimp in the cylindrical body.

* * * * *